(12) United States Patent
Postelwait et al.

(10) Patent No.: US 6,898,827 B1
(45) Date of Patent: May 31, 2005

(54) WEDGE SOCKET WITH ACTUATOR ASSEMBLY

(75) Inventors: Larry Postelwait, Catoosa, OK (US); Jerry Patton, Broken Arrow, OK (US); Bradley Allen Beall, Skiatook, OK (US)

(73) Assignee: The Crosby Group, Inc., Tulsa, OK (US)

( * ) Notice: Subject to any disclaimer, the term of this patent is extended or adjusted under 35 U.S.C. 154(b) by 0 days.

(21) Appl. No.: 10/635,360

(22) Filed: Aug. 6, 2003

(51) Int. Cl.$^7$ ............................................. F16G 11/00
(52) U.S. Cl. ..................................... 24/136 L; 403/211
(58) Field of Search .......................... 24/136 L, 136 R, 24/136 K, 115 M; 403/211, 374.1, 409.1

(56) References Cited

U.S. PATENT DOCUMENTS

| | | | |
|---|---|---|---|
| 1,078,605 A * | 11/1913 | Blackburn | 24/136 K |
| 1,090,377 A * | 3/1914 | Blackburn | 403/211 |
| 3,335,470 A * | 8/1967 | Baer | 403/211 |
| 3,905,711 A * | 9/1975 | Rogers | 24/115 M |
| 4,313,243 A | 2/1982 | Childress et al. | 24/136 |
| 4,411,132 A | 10/1983 | Crook, Jr. | 59/85 |
| 4,536,921 A | 8/1985 | Brendel et al. | 24/132 |
| 4,561,154 A | 12/1985 | Briscoe et al. | 24/136 |
| 4,718,788 A | 1/1988 | Briscoe | 403/211 |
| 4,845,814 A | 7/1989 | Crook | 24/136 |
| 5,176,341 A | 1/1993 | Ishikawa et al. | 244/116 |
| 5,336,846 A | 8/1994 | Sachs | 174/40 |
| 5,507,671 A * | 4/1996 | Chadbourne et al. | 24/136 R |
| 5,553,360 A | 9/1996 | Lucas et al. | 24/136 |
| 5,988,929 A | 11/1999 | Doan | 403/281 |
| 5,988,941 A | 11/1999 | Sargent et al. | 405/3 |
| 6,058,574 A | 5/2000 | Facey et al. | 24/136 |
| 6,058,575 A | 5/2000 | Dagan | 24/136 |

\* cited by examiner

*Primary Examiner*—Robert J. Sandy
(74) *Attorney, Agent, or Firm*—Head, Johnson & Kachigian

(57) ABSTRACT

A wedge socket with actuator assembly. A wedge socket has an elongated hollow basket with a large opening at a first end, a small opening at a second end, and a pair of sides. A wedge has a large end, a small end, a peripheral groove to receive a wire rope, and a pair of sides, wherein at least one side of the wedge has a series of recesses. At least one side of the wedge socket has an opening therethrough to permit a tool to pass through said opening to be received in one of said recesses in order to move said wedge with respect to the socket.

14 Claims, 5 Drawing Sheets

WEDGE SOCKET WITH ACTUATOR ASSEMBLY

BACKGROUND OF THE INVENTION

1. Field of the Invention

The present invention is directed to a wedge socket and wedge assembly with an actuator assisted mechanism to assist in attachment and detachment of the wedge and wire rope to the wedge socket.

2. Prior Art

Wire line is frequently used to assist in lifting, pulling or moving heavy objects. One type of wire line is wire rope which consists of a group of strands laid helically around a core. The stands of the wire rope, or cable, consist of a number of individual wires laid about a central wire. Wire rope is known to be versatile and can be used to transmit motion through various planes or angles, can be used to tie down or hold back objects, and can be used to counterbalance, guide or lift objects. Often times wire rope is made from carbon steel wires, but may be made from other materials as well.

Various different usages of wire rope may be found. In one application, one end of the wire rope is attached to a power source such as a crane or winch. The other end of the wire rope is attached to an end fitting. Types of fittings are varied and may include shackles, clips and turnbuckles.

Wedge sockets are one type of termination fitting frequently utilized with wire rope. Wedge sockets provide a mechanism to couple a free end of the wire line or wire rope to another device or object. Wedge sockets are particularly advantageous since they maybe attached and detached in the field quickly and do not require splicing, welding or other operations. In order to attach a wire rope to a wedge socket, one end of the wire rope is passed through a hollow basket of the wedge socket from a smaller opening to a larger opening. Thereafter, the wire rope is positioned in a peripheral groove around the circumference of a wedge. The end of the wire rope is then run back through the hollow basket of the wedge socket from the larger opening to the smaller opening. The wedge with the wire rope around the circumference is then inserted into the open basket of the wedge socket, trapping the wire rope between the edge of the wedge and the interior of the basket. The taper of the wedge and the taper of the inside of the basket of the socket combine so that when tension is put on the wire rope, the wedge is pulled by the wire rope and held firmly in place.

Examples of existing wedge socket designs are disclosed in Assignee's patents, such as U.S. Pat. No. 4,845,814 entitled "Wedge Socket" for a terminal end of a wire rope which, is clamped into a wedge socket. Assignee's U.S. Pat. No. 5,953,360 entitled "Extended Wedge Socket Assembly" discloses a wedge socket assembly having an extended portion on the smaller end of the wedge to act as a retaining mechanism for retaining the wedge in the socket.

More recently, new types of wire ropes have been developed having extra high strength without increased diameter. These higher strength ropes tend to be stiffer and more resistant to bending. Accordingly, they have greater difficulty accommodating the relatively sharp bending radius when the wire rope is wrapped around the peripheral edge of the wedge. Accordingly, while higher strength wire ropes are advantageous, they are more difficult to secure to wedge socket assemblies.

Attempts have been made in the past to assist or actuate in the installation of a wedge and wire rope into a wedge socket. For example, Facey et al. (U.S. Pat. No. 6,058,574) discloses a wedge that may be moved in the bore by a rod like tool into an open end of the socket. Childress et al. (U.S. Pat. No. 4,313,243) discloses a wedge clamp having slots through opposed sidewalls of a sliding wedge thimble cable clamp casing and a slot through the wedge thimble with a tapered key that is engageable through the slots to lock the wedge into the socket.

There remains a need to provide a wedge socket with an actuator for easy and simple attachment and detachment of the wedge and wire rope with the wedge socket basket.

There remains a need to provide a wedge socket with actuator installation utilizing readily available field tools without need of other tools or equipment.

There remains a need to provide a wedge socket positioning device to allow the wedge and wire rope to be installed concurrently or simultaneously during an actuating process.

There remains a need to provide a wedge socket with an actuator for high strength compacted strand wire rope that can accommodate small diameter wedges.

SUMMARY OF THE INVENTION

The present invention is directed to a wedge socket with actuator assembly. The assembly includes a wedge socket having an elongated hollow basket with a large opening at a first end, a small opening at a second end, an interior cross-section tapering from the large first end to the small second end, and a pair of opposed sides.

The wedge socket also includes a connector extending from the large opening at the first end.

The connector includes a pair of opposed jaws, each jaw having an opening therethrough to receive a transverse pin.

The assembly also includes a wedge having a large end, a small end, and a peripheral edge groove in order to receive a wire rope therein. The wedge also includes a pair of opposed sides.

At least one side of the wedge has a series of aligned recesses.

One side of the wedge socket has a pair of openings therethrough. The openings permit access through the side of the wedge socket into the interior of the wedge socket.

In order to utilize the present invention, an end of the wire rope is initially run through the wedge socket from the small end to the large end. Thereafter, the wire rope is placed in the peripheral groove around the circumference of the wedge. The end of the wire rope is then run back through the hollow basket of the wedge socket. Thereafter, the wedge and the wire rope wrapped therearound are moved toward and into the hollow basket. The wedge is then actuated using the teachings of the present invention.

A readily available tool, such as a screwdriver, is inserted through one of the openings in the side of the wedge socket. The end of the screwdriver is inserted through the sidewall until it engages one of the slots in the wedge. Using the screwdriver as a lever, with the side of the wedge socket used as a fulcrum, the wedge is moved into the wedge socket so that the wedge and the wire rope are firmly seated in the wedge socket.

The present invention permits high strength compacted strand wire ropes to be bent around the relatively small diameter radius of a wedge.

In order to disengage the wedge and wire rope, the reverse procedure is performed.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
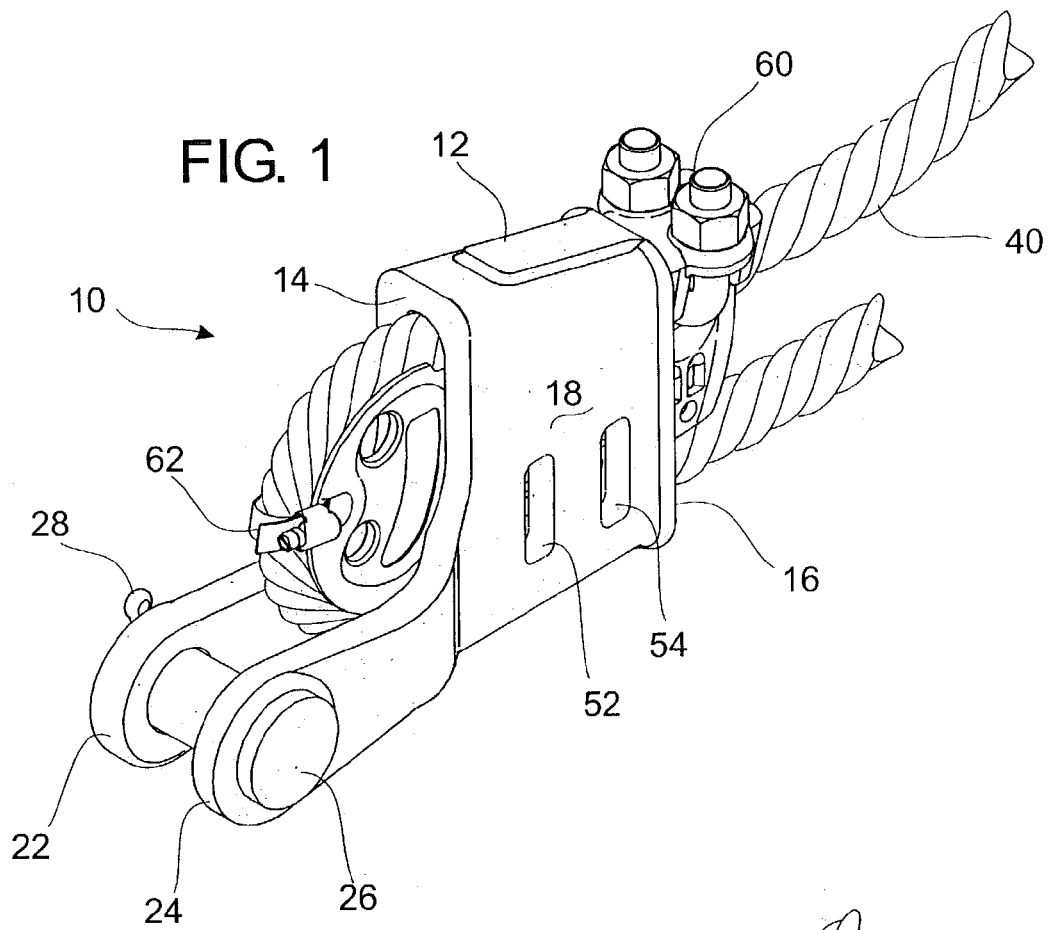
FIG. 1 is a perspective view of a wedge socket with actuator assembly constructed in accordance with the present invention.
Figure 2:
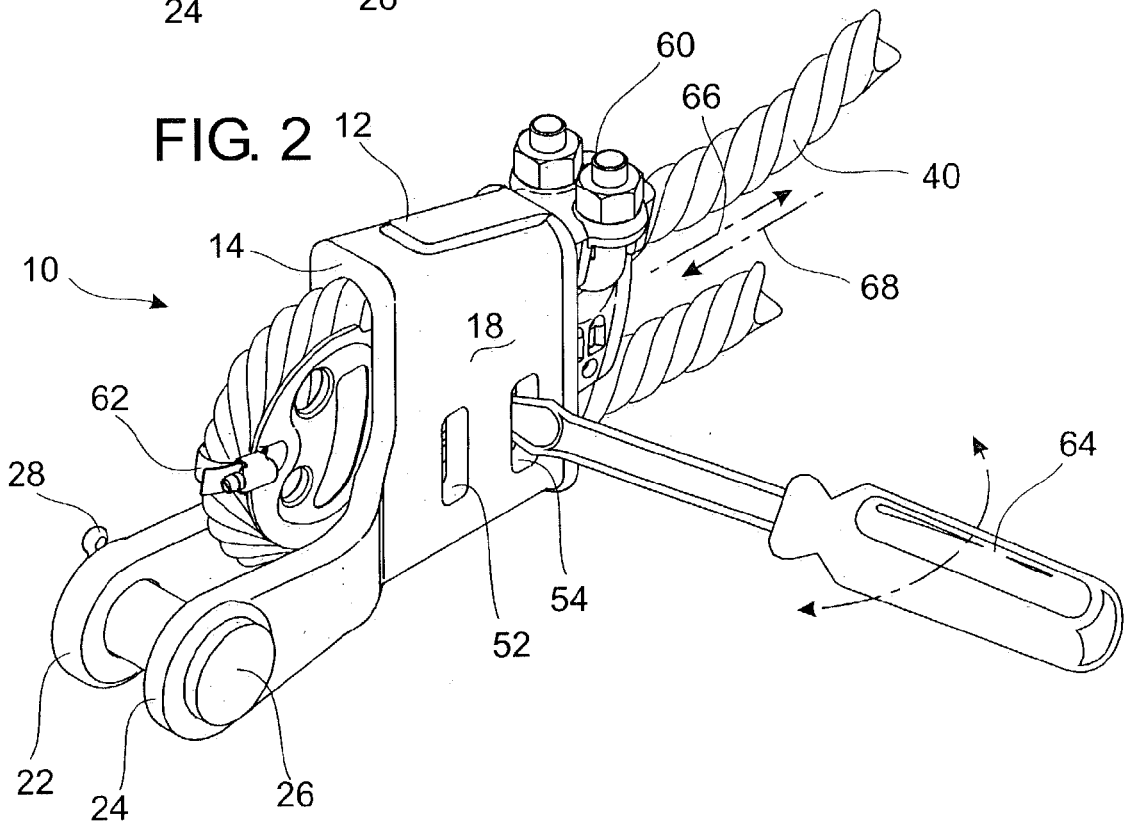
FIG. 2 is a perspective view of the assembly showing the actuator mechanism in operation.

Referring to the drawings in detail, FIG. 1 illustrates a perspective view of a wedge socket with actuator assembly 10 constructed in accordance with the present invention. FIG. 2 illustrates a perspective view of the assembly 10 showing the actuator mechanism or means utilized to impart movement to a wedge of the assembly as will be described in detail herein.

Figure 3:
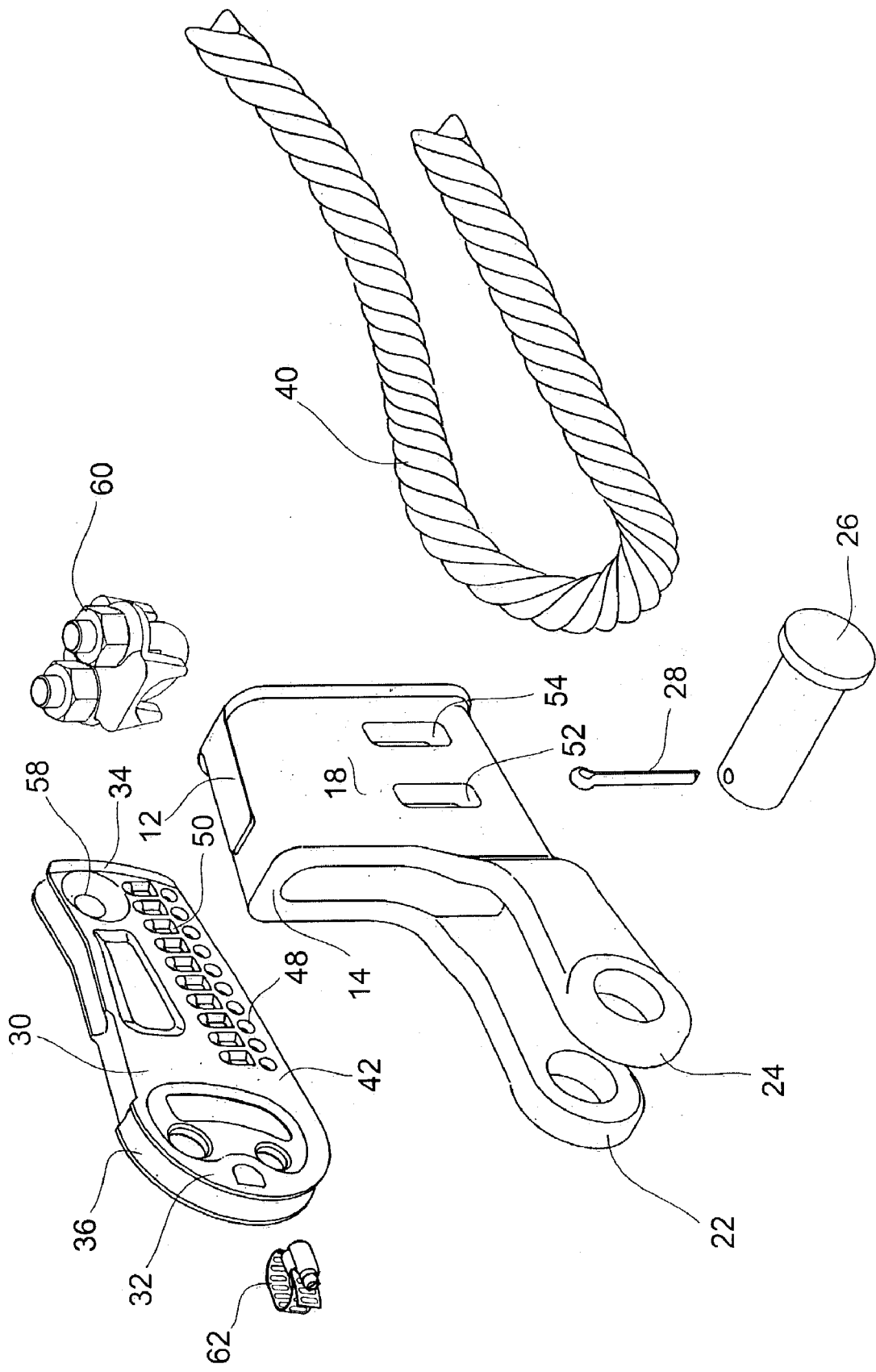
FIG. 3 is an exploded view of the wedge socket with actuator assembly shown in FIG. 1.

FIG. 3 illustrates an exploded view of the various components of the wedge socket with actuator assembly 10.

The assembly 10 includes a wedge socket 12 having an elongated hollow basket with a large opening at a first end 14 and a small opening at a second end 16. The wedge socket 12 also has an interior cross-section tapering from the large first end 14 to the small second end 16. The wedge socket 12 also has a pair of opposed sides 18 and 20.

The wedge socket also includes a connector extending from the socket first end 14 wherein in the preferred embodiment the connector includes a pair of opposed jaws 22 and 24. Each of the jaws 22 and 24 has an opening therethrough. The openings are axially aligned with each other to receive a transverse pin 26 that may be retained in the openings by a cotter pin 28. It will be appreciated that other types of connectors may be utilized within the spirit and scope of the present invention. The connector will be used to connect the wedge socket assembly to a load. The load may be directly connected to the connector or, alternatively, a block, hook, or chain may be connected to the connector.

Figure 4:
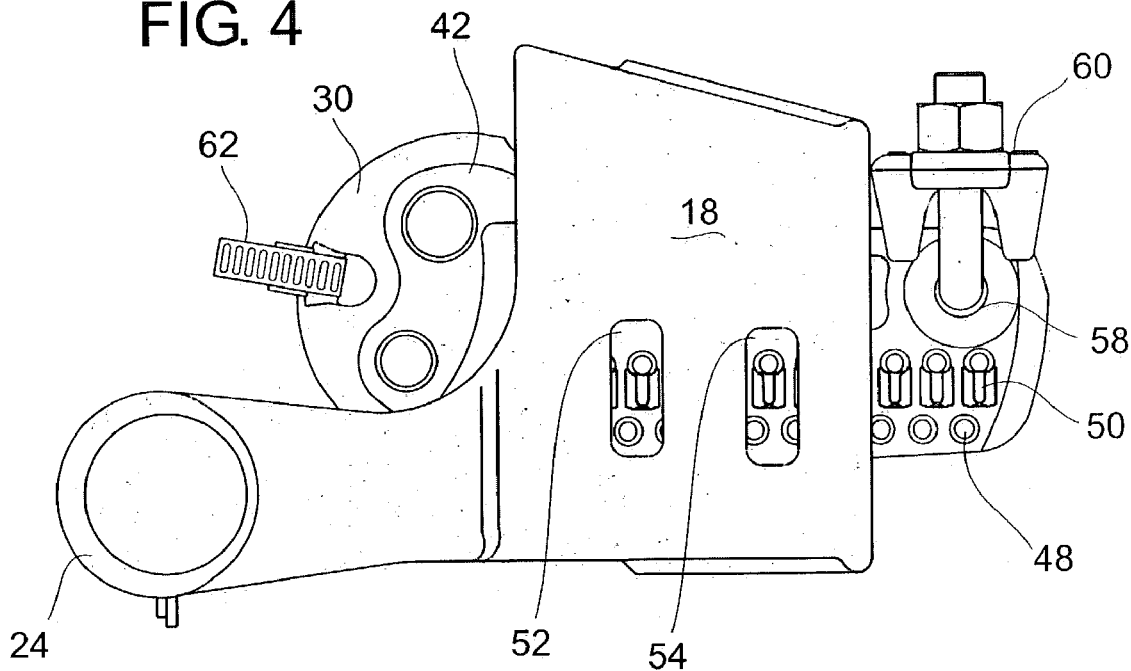
FIG. 4 is a right side view and FIG. 5 is a left side view of the wedge socket with actuator assembly with the wire rope removed.
Figure 5:
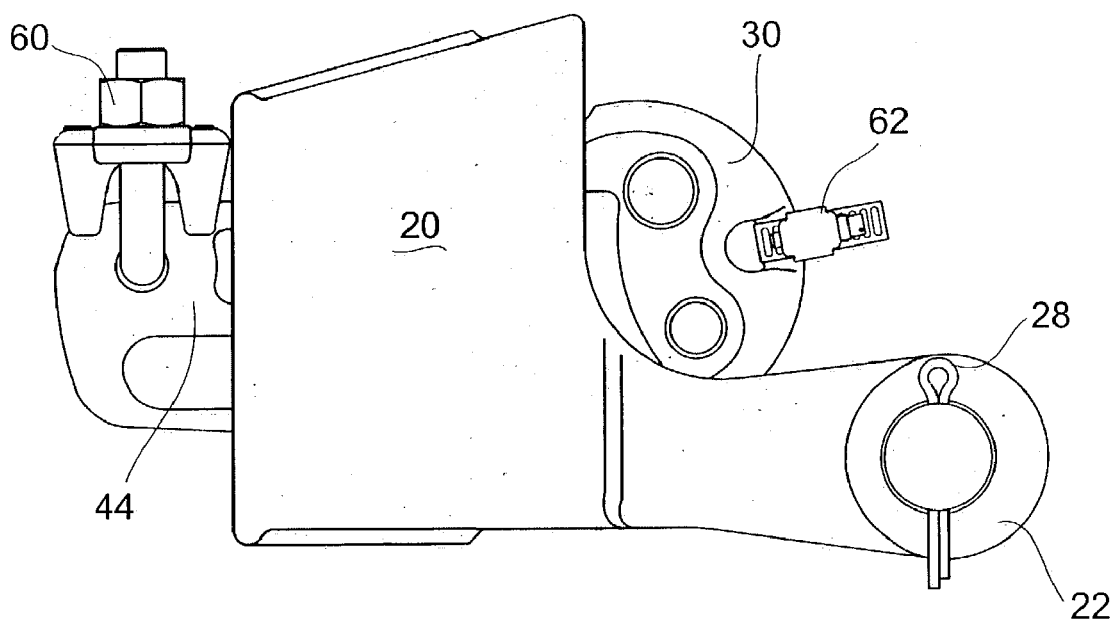

FIG. 4 illustrates a right side view and FIG. 5 illustrates a left side view of the assembly without the wire rope.

Figure 6:
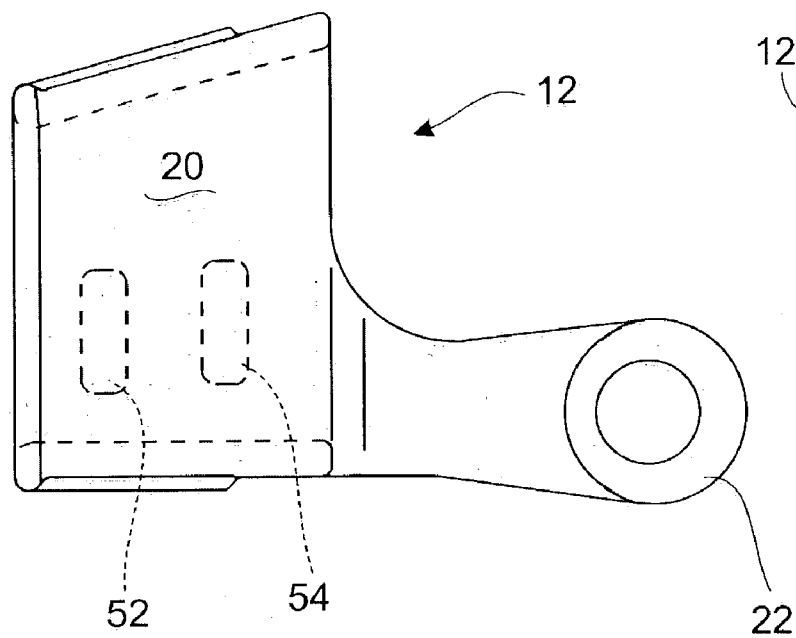
FIG. 6 is a left side view.
Figure 7:
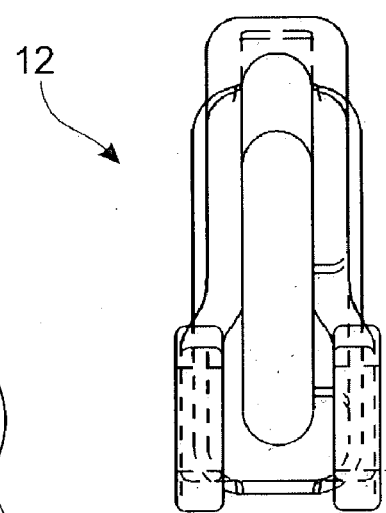
FIG. 7 is an end view.
Figure 8:
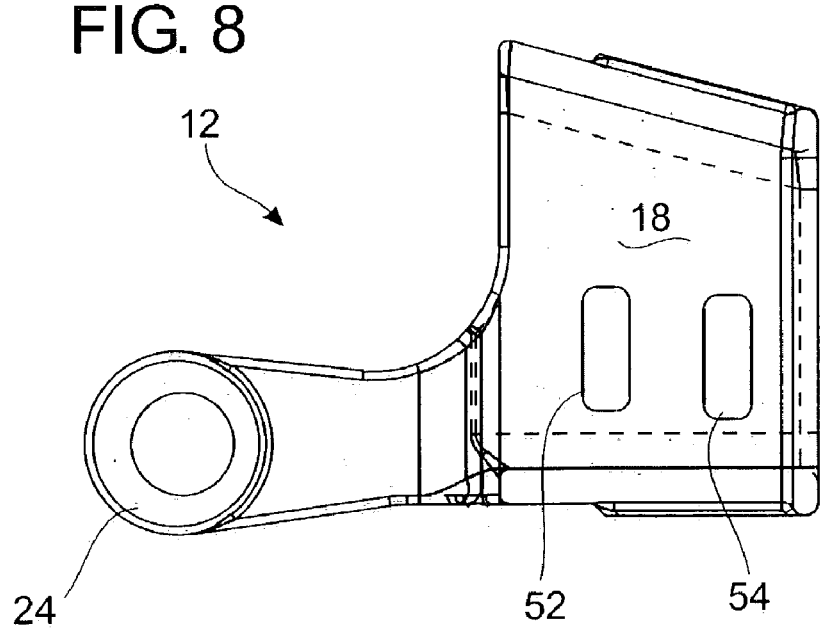
FIG. 8 is a right side view of the wedge socket apart from the assembly.

FIG. 6 illustrates a left side view, FIG. 7 is an end view, and FIG. 8 is a right side view of the wedge socket apart from the device.

Figure 9:
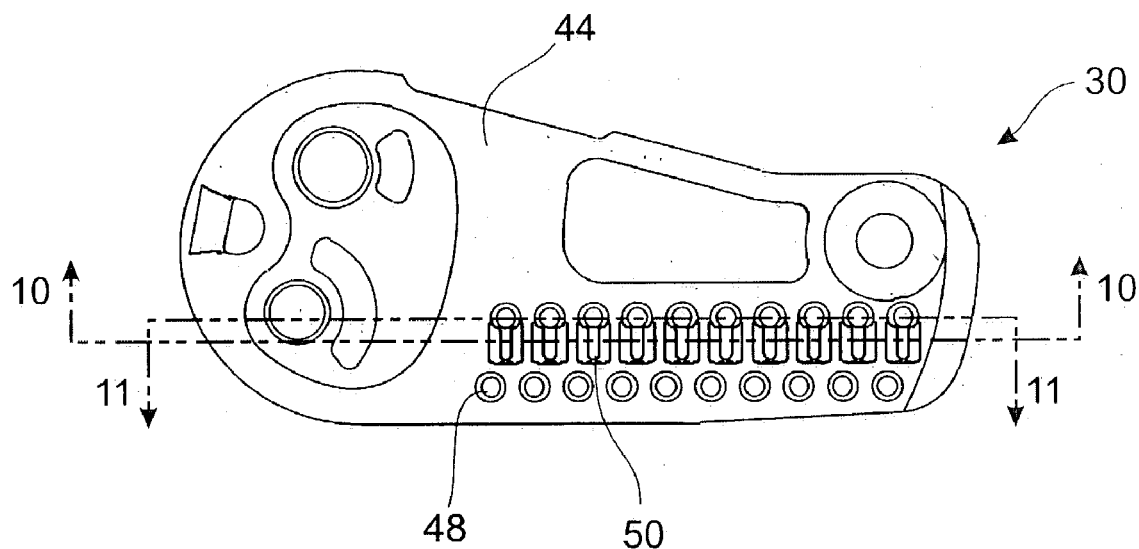
FIG. 9 is a right side view of the wedge apart from the assembly.
Figure 10:
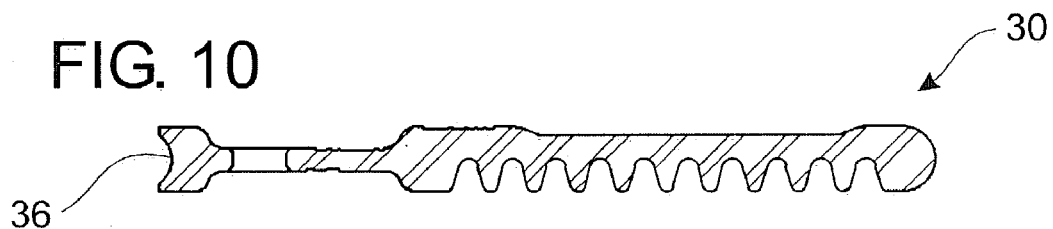
FIG. 10 is a sectional view taken along section line 10—10 of FIG. 9.
Figure 11:
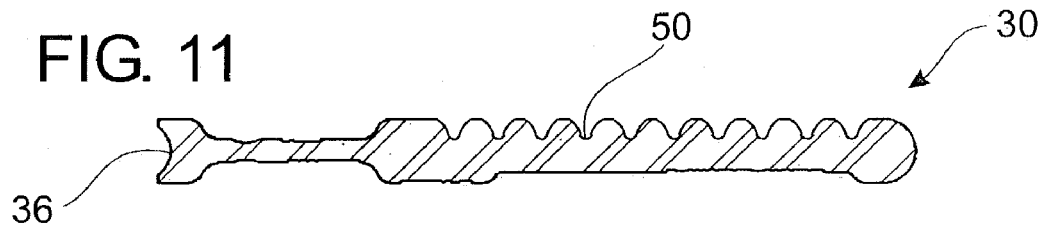
FIG. 11 is a sectional view taken along section line 11—11 of FIG. 9.

The assembly also includes a wedge 30 fully visible in the exploded view in FIG. 3 and also shown apart from the device in FIGS. 9, 10 and 11. The wedge 30 includes a large end 32, a small end 34, and a peripheral edge groove 36 in order to receive a wire rope 40 therein. The wedge 30 also includes a pair of opposed sides 42 and 44.

At least one side of the wedge, in this case side 42, has a series of aligned recesses.

As best seen in FIGS. 3, 4 and 9, the present embodiment includes a series of aligned semi-circular recesses 48 and a plurality of aligned slots 50.

One side 18 of the wedge socket has a pair of openings 52 and 54 therethrough. The openings permit access through the side of the wedge socket into the interior of the wedge socket. When the wedge is inserted, the openings 52 and 54 provide access to the recesses 48 and the slots 50 in the wedge.

The wedge 30 also includes an extended portion which when inserted into the socket extends beyond the wedge socket. The extended portion may include a transverse opening 58 and a wedge retaining means or mechanism, such as a wire rope clip 60, to prevent the wedge from moving back out of the socket once installed.

Finally, the assembly 10 may include a clamp 62, such as a wire rope clip, in order to utilize the present invention to engage a wedge and a wire rope in a wedge socket.

In order to utilize the invention, an end of the wire rope 40 is initially run through the wedge socket from the small end 16 to the large end 14. Thereafter, the wire rope 40 is placed in the peripheral groove 36 around a circumference of the wedge 30. Then, the end of the wire rope 40 is run back through the hollow basket of the wedge socket 12. The wire rope clip 60 is installed to connect the wire rope 40 to the wedge 30. Thereafter, the wedge 30 with the wire rope 40 wrapped therearound is moved toward and into the hollow basket. The wedge is then actuated using the teachings of the present invention.

As shown in FIG. 2, a readily available tool, such as a screwdriver 64, is inserted through one of the openings, such as opening 54, in the side 18 of the wedge socket. The end of the screwdriver 64 is inserted through the sidewall 18 until it engages one of the slots 50 in the side of the wedge. Using the screwdriver 64 as a lever, with the side 18 of the wedge socket utilized as a fulcrum, the wedge 30 is moved into the wedge socket in the direction shown by arrow 66. Prior thereto, the clamp 62 is inserted through the opening in the wedge 30 and then wrapped around the wire rope. The foregoing process may be repeated until the wedge and wire rope are firmly seated in the wedge socket.

It has been found that the wedge socket is easy to assemble in the field and alleviates some of the difficulty in bending of high strength wire rope required.

In order to disengage the wedge and wire rope from the wedge socket, the reverse procedure is performed. The tool, screwdriver 64, is inserted through the opening 54 of the side 18 of the wedge socket 12. The end of the tool engages one of the slots 50 and the tool is moved using the side as a fulcrum in order to assist in moving the wedge 30 and wire rope in the direction shown by arrow 68.

Tests using the present invention confirm that high strength compacted strand wire rope may be bent around the diameter of the wedge and installed in the socket without difficulty. In a ratio comparing the diameter of the large end of the wedge to the diameter of the rope, the present invention will operate to a minimum of 5.

Whereas, the present invention has been described in relation to the drawings attached hereto, it should be understood that other and further modifications, apart from those shown or suggested herein, may be made within the spirit and scope of this invention.

What is claimed is:

1. A wedge socket with actuator assembly which comprises:
   a wedge socket having an elongated hollow basket with a large opening at a first end, a small opening at a second end, an interior cross-section tapering from said large opening to said small opening, and a pair of sides;
   a connector extending from said first end;
   a wedge having a large end, a small end, a peripheral groove to receive a wire rope, and a pair of sides, wherein at least one said side of said wedge has a series of recesses, said series of recesses including a plurality of aligned semi-spherical recesses and a plurality of aligned slots;
   wherein at least one said side of said wedge socket has at least an opening therethrough to permit a tool to pass through said opening to be received in one of said recesses in order to move said wedge with respect to said socket.

2. A wedge socket with actuator assembly as set forth in claim 1 including a clip to attach said wire rope to said large end of said wedge.

3. A wedge socket with actuator assembly as set forth in claim 1 wherein said at least one opening through said wedge socket includes two slots.

4. A wedge socket with actuator assembly as set forth in claim 1 wherein a ratio of a diameter of said large end of said wedge to a diameter of said wire is a minimum of five or greater.

5. A wedge socket with actuator assembly as set forth in claim 1 wherein said small end of said wedge has an extended portion extending beyond said basket.

6. A wedge socket with actuator assembly as set forth in claim 4 wherein said extended portion has a transverse opening and a wedge retaining means.

7. A wedge socket with actuator assembly as set forth in claim 1 wherein said connector includes a pair of jaws extending from said first end and a pin connecting said jaws.

8. A wedge socket with actuator assembly which comprises:
   a wedge socket having an elongated hollow basket with a large opening at a first end, a small opening at a second end, an interior cross-section tapering from said large to said small opening, and a pair of sides;
   a connector extending from said first end;
   a wedge having a large end, a small end, a peripheral groove to receive a wire rope, and a pair of sides, wherein at least one side of said wedge has a series of recesses;
   a clip in order to secure said wire rope to said large end of said wedge; and
   lever means to impart movement to said wedge with respect to said socket by inserting a tool through an opening in said side of said wedge socket and using said side as a fulcrum.

9. A wedge socket with actuator assembly as set forth in claim 8 wherein a ratio of a diameter of said large end of said wedge to a diameter of said wire is a minimum of five or greater.

10. A wedge socket with actuator assembly as set forth in claim 8 wherein said small end of said wedge socket has an extended portion extending beyond said basket.

11. A method to engage a wedge having a pair of sides in a wedge socket having an elongated hollow basket with a large opening at a first end, a small opening at a second end, and a pair of sides, which method comprises:
   running an end of a wire rope through said hollow basket of said wedge socket from said small opening to said large opening;
   positioning said wire rope in a peripheral groove around the circumference of said wedge and then running said end of wire rope back through said hollow basket of said wedge socket;
   inserting said wedge with said wire rope therearound into said hollow basket;
   actuating said wedge with respect to said wedge socket by inserting a tool through at least one opening in said side of said socket and into at least one recess in one of said sides of said wedge; and
   using said side of said socket as a fulcrum to move said wedge.

12. A method as set forth in claim 11 including the additional step of clipping said wire rope to said large end of said wedge prior to actuating said wedge with said tool.

13. A method as set forth in claim 11 wherein said side of said wedge has a plurality of aligned recesses and wherein said step of actuating said wedge is repeated until said wedge and said wire rope are tightly engaged with said socket.

14. A method as set forth in claim 11 wherein all said steps are performed in reverse order to disengage said wedge.

* * * * *